United States Patent
Wong et al.

(10) Patent No.: US 9,505,089 B1
(45) Date of Patent: Nov. 29, 2016

(54) WELDING FINGER

(71) Applicants: Harry Wong, South Pasadena, CA (US); Daqing Zhu, Shanghai (CN)

(72) Inventors: Harry Wong, South Pasadena, CA (US); Daqing Zhu, Shanghai (CN)

( * ) Notice: Subject to any disclaimer, the term of this patent is extended or adjusted under 35 U.S.C. 154(b) by 1 day.

(21) Appl. No.: 14/756,165

(22) Filed: Aug. 10, 2015

(51) Int. Cl.
  *B25B 1/20* (2006.01)
  *B23K 37/04* (2006.01)
  *B25B 11/00* (2006.01)
  *B25B 5/00* (2006.01)

(52) U.S. Cl.
  CPC .......... *B23K 37/0435* (2013.01); *B25B 5/003* (2013.01); *B25B 11/00* (2013.01)

(58) Field of Classification Search
  CPC ......... B23Q 19/04; B25B 9/00; B25B 13/58; B23K 3/00; B23K 9/32; B23K 11/36; B23K 37/0435
  USPC ...................... 248/117.1, 117.4, 117.6, 117.7
  See application file for complete search history.

(56) References Cited

U.S. PATENT DOCUMENTS 5,934,656 A * 8/1999 Carder ...................... B25B 5/06
                                                      269/152

* cited by examiner

*Primary Examiner* — Monica Carter
*Assistant Examiner* — Nirvana Deonauth

(57) ABSTRACT

A clamping device utilizing the principle of leverage comprises a body, a L-shape front clamping leg, a pair of L-shape rear clamping legs, a spring clip, and a braided ground wire. Both the front and the rear clamping legs are slidable on the body and fixed by wing screws so that the position of the body relative to the front and rear clamping legs is adjustable and hence the clamping size and clamping force are also adjustable. Copper tips are added to the legs to eliminate sparkling while welding. A braided wire can be connected to the body for grounding purpose.

7 Claims, 5 Drawing Sheets

WELDING FINGER

BACKGROUND OF THE INVENTION

1. Field of the Invention

The present invention relates to a class of work holding device, or grasshopper clamps in general, and more particularly to welding finger having a slidable L-shape front clamping leg with copper tip, a pair of slidable L-shape rear clamping legs with copper tips, a relatively heavy body, a spring clip mounted on the front clamping leg and a braided ground wire connected to the body. The present invention is a convenient and easy to use work holding device specially designed for welding industry. To clamp a workpiece for welding, just lay the present invention on a welding table with its rear clamping legs touching the table surface and place the workpiece between the front clamping leg and the table surface. The weight of the body will hold the workpiece against the table surface steadily and ready for welding. Both the front and the rear clamping legs are made to be slidable on the body so that the lengths between the copper tips and the body are adjustable. Hence the clamping force applied to the workpiece against the table surface is also adjustable. If the shape of the workpiece is so odd that it cannot be held firmly by the front clamping leg against the table surface, then the spring clip will be used instead. To ground the workpiece for welding, a ground clamp is used to clamp the free end of the braided ground wire instead of the body of the present invention. Since the braided ground wire is flexible, the use of a ground clamp will not disturb the clamping setup of the workpiece.

2. Description of the Related Art

Grasshopper clamps have been used in the welding industry for a while. It is a very simple device and very convenient to use. It comprises a relatively heavy body and three L-shape legs mounted to the body. Just put the grasshopper clamp on a welding table and put the workpiece between one of the legs and the surface of the welding table. The weight of the body will provide the clamping force required to hold the workpiece steadily in place for welding purpose.

Conventionally, the three legs are fixed to the body so that the length between the clamping tip of a leg and the center of gravity of the body is not adjustable. This will limit the application of the grasshopper to limited sizes of workpieces. It is the intention of the present invention to solve this problem by making both the front and rear clamping legs slidable over the body. The clamping legs of a conventional grasshopper is usually made of iron. This may cause sparkling between the workpiece and the clamping tips during the welding process. The present invention eliminates this problem by adding copper tips to the clamping legs. To enhance the flexibility of the present invention, a spring clip is attached to the front clamping leg. This spring clip can be used to hold on a workpiece with special shape or hold on a second workpiece while the front clamping leg is holding a first workpiece. For better conductivity and convenience, a braided ground wire is connected to the body of the present invention. During the welding process, a ground clamp will clamp the free end of the braided ground wire instead of the body of the present invention. Thus the clamping action of the ground clamp will not affect the work holding setup of the present invention.

SUMMARY OF THE INVENTION

The present invention comprises a body, a slidable L-shape front clamping leg, a pair of slidable L-shape rear clamping legs, a spring clip mounted on the front clamping leg, and a braided ground wire connected to the body. The body is made of conductive metal so that it is relatively heavy. The L-shape front clamping leg is mounted to the top surface of the body by a wing screw and a bracket so that the distance between the tip of the front clamping leg and the center of gravity of the body is adjustable. The rear legs are made of a pair of L-shape clamping legs linked together to form a Y-shape assembly. It is mounted to the bottom surface of the body by a wing screw and a bracket so that the distance between the tips of the rear clamping legs and the center of gravity of the body is also adjustable. With the slidable legs design, the effective clamping size of the present invention can be adjusted to suit workpieces of different sizes. Changing the relative position of the body between the front clamping leg and the rear clamping legs will change the clamping force of the front leg applied on the workpiece according to the principle of leverage. Moving the body closer to the front clamping leg will increase the clamping force, moving the body closer to the rear clamping legs will decrease the clamping force. Copper tips are added to each clamping leg so that sparkling between the workpiece and the clamping legs while welding can be eliminated. Workpiece of uneven surface or odd shape may not be clamped steadily with the front clamping leg of the present invention, a spring clip is mounted to the front clamping leg to hold the workpiece instead. In some applications, the spring clip can be used to hold a second workpiece while the present invention is clamping a first workpiece under the front clamping leg. The spring clip is slidable on the front clamping leg for added flexibility, it is fixed to the front clamping leg with a wing screw. Furthermore, the spring clip provides a means to hang or store the present invention when it is not in use. A braided wire is connected to the body of the present invention with a wing screw so that the welding ground clamp can be attached to its free end.

DETAILED DESCRIPTION OF THE INVENTION

With the help of the drawings and the detailed description below, the features of the present invention will be apparent and fully understandable.

Figure 1:
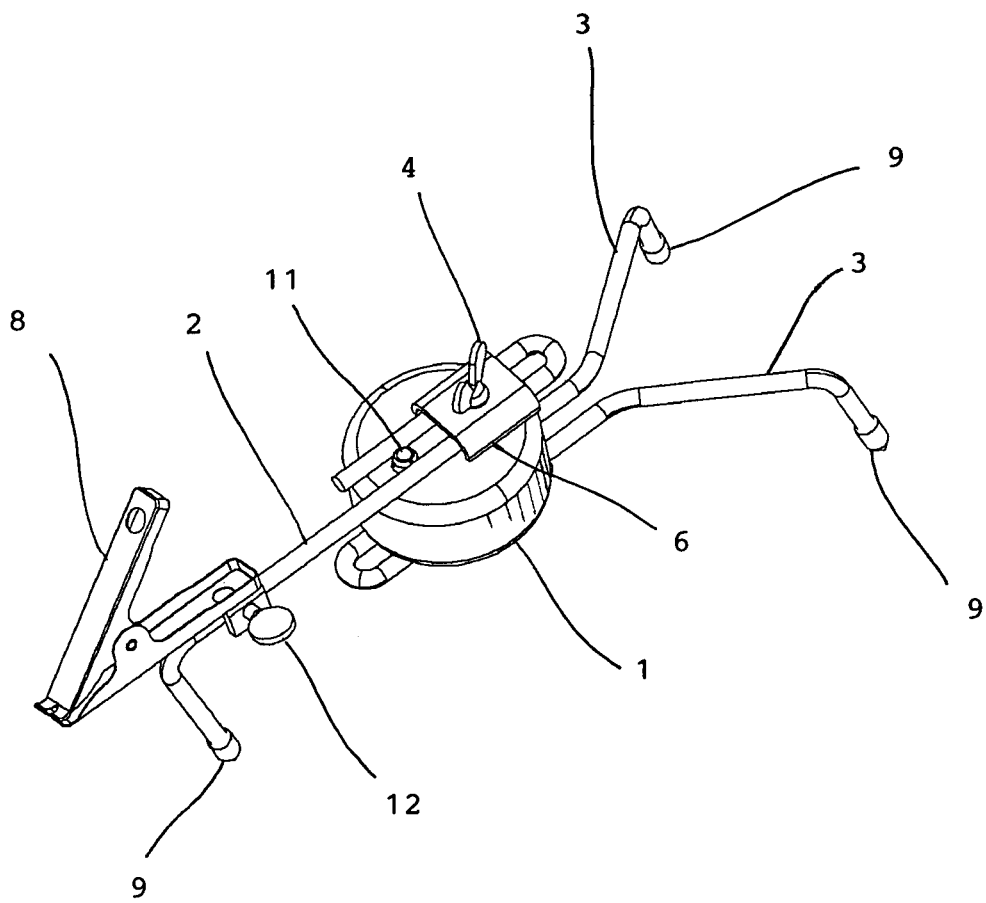
FIG. 1 is a perspective view of the welding finger showing the front, the top and the right side.
Figure 5:
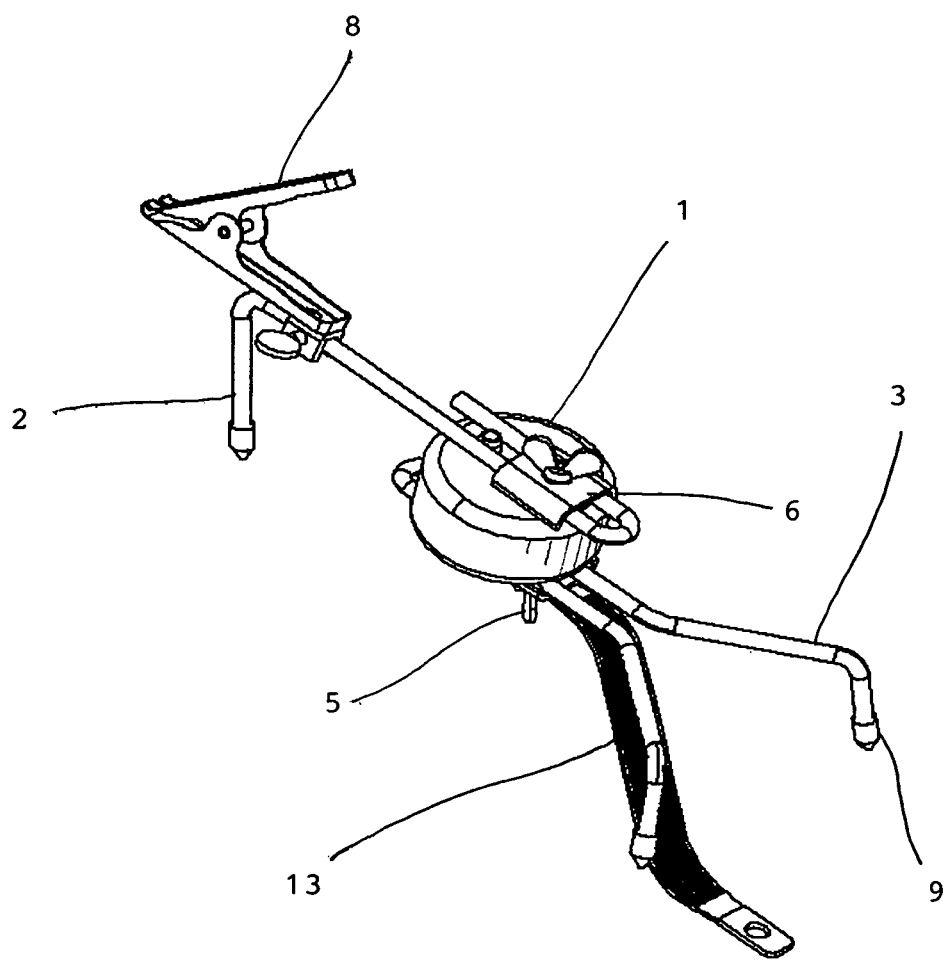
FIG. 5 is a perspective view of the welding finger connected with a braided wire for grounding purpose.

Referring to FIG. 1 and FIG. 5, the present invention comprises a body 1, a L-shape front clamping leg 2, a pair of L-shape rear clamping legs 3, a spring clip 8, and a braided ground wire 13. One end of the L-shape front clamping leg 2 is made to be a narrow U-shape so that the front clamping leg 2 is slidable along a guide pin 11 on the top surface of body 1 and can be fixed to body 1 by a wing screw 4 and a bracket 6. Spring clip 8 is slidable over front clamping leg 2 and can be fixed to front clamping leg 2 by wing screw 12.

Figure 2:
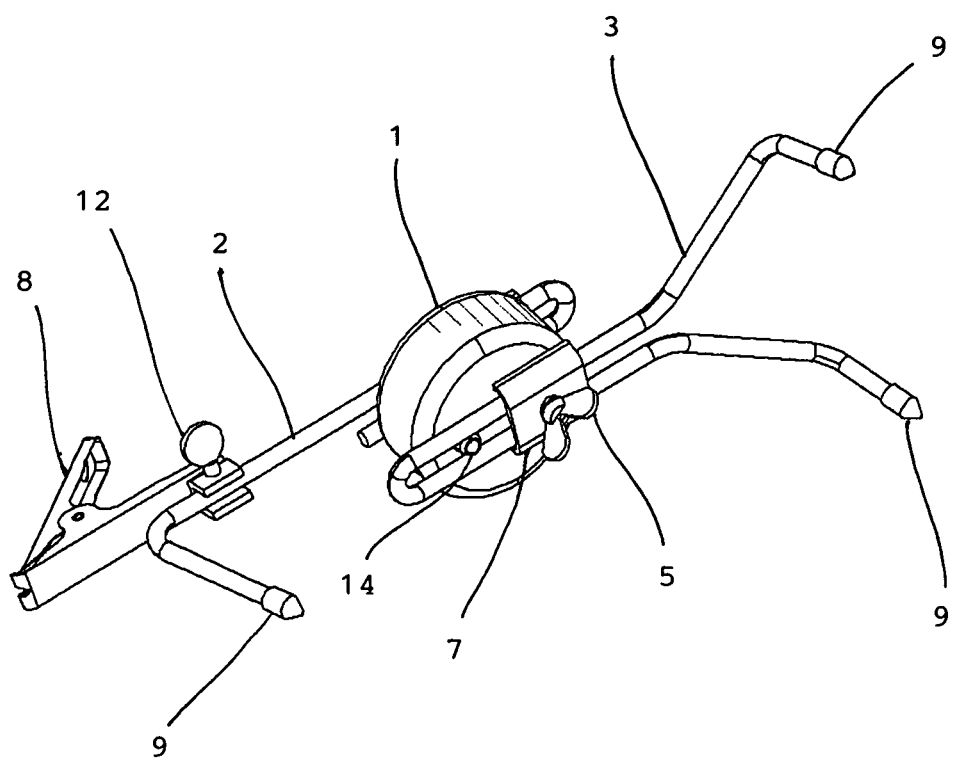
FIG. 2 is a perspective view of the welding finger showing the rear, the bottom and the right side.

With reference to FIG. 2, the L-shape rear clamping legs 3 are joined together at one end to form a Y-shape. The junction end is made to be a narrow U-shape so that the rear clamping legs 3 are slidable as an assembly along guide pin 14 on the bottom surface of body 1 and can be fixed to body 1 by a wing screw 5 and a bracket 7.

A copper tip 9 is added to the free end of each clamping leg to eliminate sparkling between the legs and the workpiece during the welding process.

Figure 3:
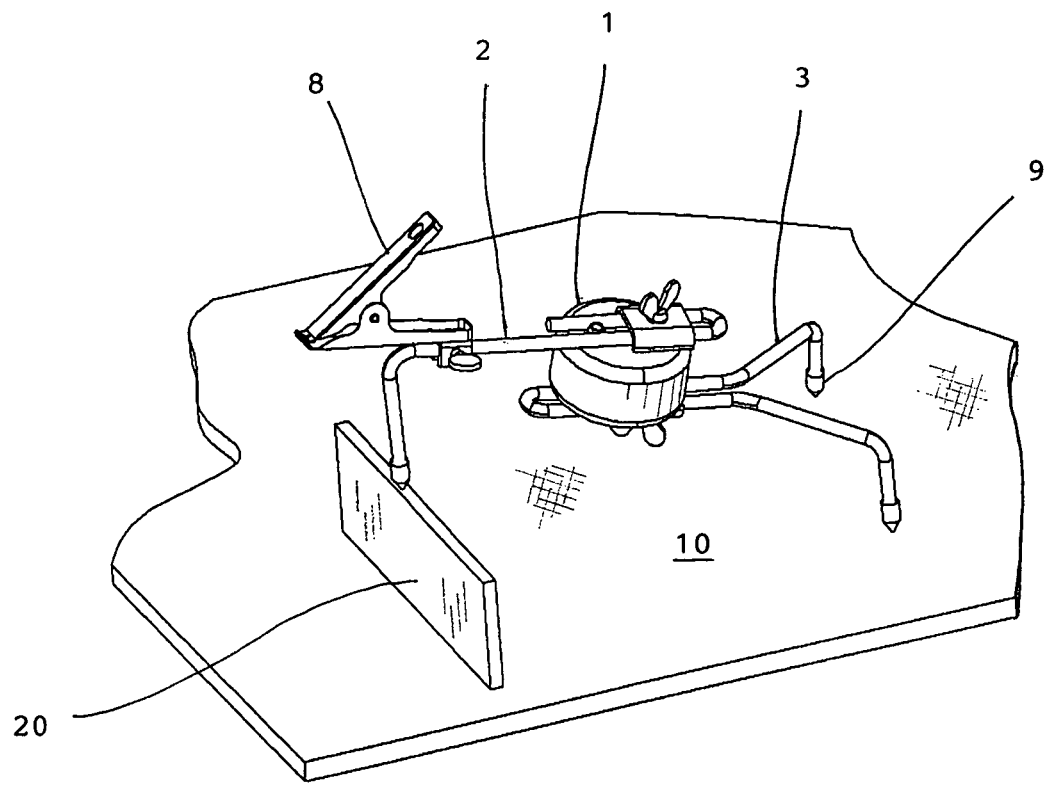
FIG. 3 is a perspective view of the welding finger sitting on the surface of a welding table clamping a workpiece under the front clamping leg.

FIG. 3 shows the present invention sitting on a welding table surface 10 with rear clamping legs 3 and holding a workpiece 20 with front clamping leg 2. Holding force on the workpiece 20 is provided by the weight of body 1 under the principle of leverage. Changing the distance between the copper tip 9 of front clamping leg 2 and the center of gravity of body 1 will change the holding force on workpiece 20. Changing the distance between the copper tips 9 of rear clamping legs 3 and the center of gravity of body 1 will change the holding force also.

Figure 4:
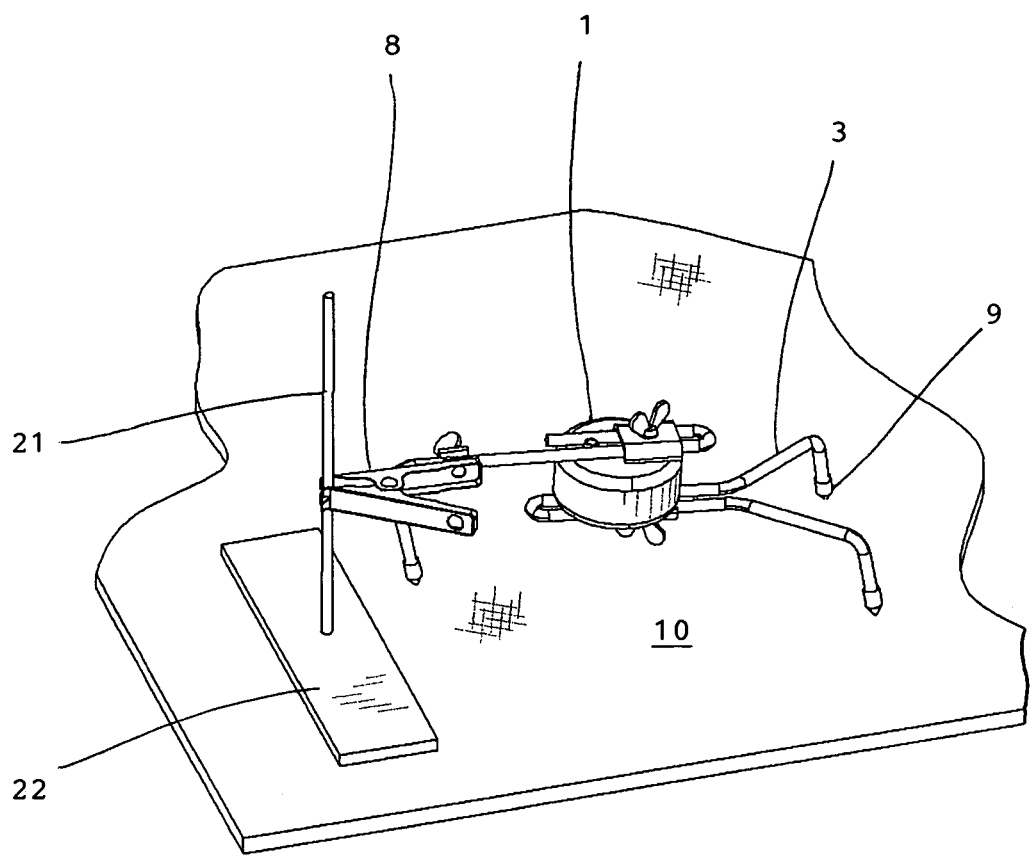
FIG. 4 is a perspective view of the welding finger clamping a first workpiece vertically with the spring clip against a second workpiece resting on the table surface.

As shown in FIG. 4, the present invention is holding a first workpiece 21 vertically with the spring clip 8, and in turn, first workpiece 21 is holding a second workpiece 22 on the table surface 10. In this application, first workpiece 21 is held at a particular spatial relationship with second workpiece 22 by the present invention. Welding can be performed between the first workpiece 21 and the second workpiece 22. The spring clip 8 is slidable over the front clamping leg 2, so other applications are possible. This adds the flexibility of the present invention.

FIG. 5 shows a braided ground wire 13 attached to the bottom of body 1. The ground wire 13 is flexible so that the clamping setup will not be disturbed when the ground clamp is attached to the free end of ground wire 13 during the welding process.

What we claim as my invention is:

1. A welding finger comprising: a body; a L-shape front clamping leg slidable over said body; a pair of L-shape rear clamping legs slidable over said body; a spring clip slidable over said front clamping leg; and a braided ground wire attached to said body.

2. The welding finger according to claim 1, wherein said body is made of solid conductive material.

3. The welding finger according to claim 1, wherein said front clamping leg is made of conductive material and can be fixed to the top of said body by a wing screw and a bracket.

4. The welding finger according to claim 1, wherein said rear clamping legs are made of conductive material and can be fixed to the bottom of said body by a wing screw and a bracket.

5. The welding finger according to claim 1, wherein said front clamping leg and said rear clamping legs are equipped with copper tips at the free ends.

6. The welding finger according to claim 1, wherein said spring clip is made of conductive material and can be fixed to said front clamping leg with a wing screw.

7. The welding finger according to claim 1, wherein said ground wire is made of flexible and conductive material.

\* \* \* \* \*